P. H. THOMAS.
STARTING DEVICE FOR VAPOR CONVERTERS.
APPLICATION FILED SEPT. 24, 1909.
1,110,597. Patented Sept. 15, 1914.
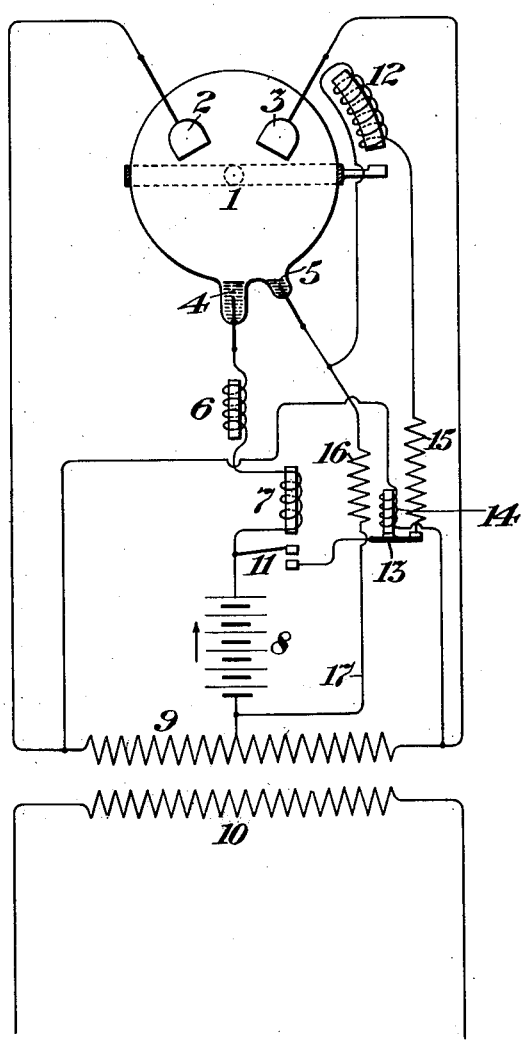

UNITED STATES PATENT OFFICE.

PERCY H. THOMAS, OF MONTCLAIR, NEW JERSEY, ASSIGNOR, BY MESNE ASSIGNMENTS, TO COOPER HEWITT ELECTRIC COMPANY, OF HOBOKEN, NEW JERSEY, A CORPORATION OF NEW JERSEY.

STARTING DEVICE FOR VAPOR-CONVERTERS.

1,110,597.     Specification of Letters Patent.     Patented Sept. 15, 1914.

Original application filed May 11, 1905, Serial No. 259,956. Divided and this application filed September 24, 1909. Serial No. 519,380.

*To all whom it may concern:*

Be it known that I, PERCY H. THOMAS, a citizen of the United States, and resident of Montclair, county of Essex, State of New Jersey, have invented certain new and useful Improvements in Starting Devices for Vapor-Converters, of which the following is a specification.

It has been proposed to start vapor converters such as are exemplified by the well-known mercury vapor converter, by means of a storage battery acting through metallic contacts which are brought together and separated within the converter. This starting has usually been done by hand and the connection has been made by the use of a reversing switch which originally connects the storage battery in one direction through the apparatus and afterward reverses the connections. In the present instance I cause no reversal of the polarity of the storage battery, but depend upon connections which will be fully described in the present specification.

The drawing herewith is a diagram of circuits and apparatus which may be used in carrying out my invention.

In the drawings, 1 is the container of a mercury vapor converter, 2 and 3 are positive electrodes of solid material therein, and 4 is the main negative electrode of the apparatus, 5 being a supplemental electrode therefor.

To the negative electrode 4 I join a conductor including an inductance, 6, leading through a magnet, 7, to one pole of a storage battery, 8, the opposite pole of which is joined to an intermediate point of the secondary, 9, of a transformer having a primary, 10. The terminals of the secondary 9 are joined to the positive electrodes 2 and 3. Between the storage battery 8 and the magnet 7 I arrange a cut-out, 11, capable of being operated by the said magnet; and I also provide a tilting magnet, 12, both the tilting magnet and the cut-out being included in a circuit including the battery 8 and a resistance, 16, and shunting the supplemental electrode 5. Between the terminals of the secondary 9 I may place a coil, 14, adapted to operate a switch, 13, included in the circuit leading from one side of the battery 8 to the tilting magnet 12. In the last described circuit I may also include a resistance, 15.

The operation of the described organization is as follows: When the alternating current circuit leading to the primary 10 is closed, and the secondary 9 is excited, the coil 14 will be energized and thus close the switch 13. Current from the storage battery 8 will then pass by way of the switch 13, the resistance 15 and the coil 12 to the opposite pole of the storage battery, causing the container 1 to be tilted until the mercury at 4 connects with the mercury at 5. This action closes a shunt circuit to the coil 12 through the magnet 7, the inductance 6, the electrodes 4 and 5 and the resistance 16, deflecting the current from the coil 12 and allowing the container to fall back, thus breaking contact between the electrodes 4 and 5. This causes the direct current from the battery 8 to pass through the vapor from 4 to 5, the latter being temporarily the negative electrode. During the first alternation, the electrodes 2 and 3 pass current through the converter by way of the electrode 5 and through the battery 8 and the shunt thereto according to the well-known principle of the single-phase vapor converter. On account of the predominance of the alternating current electro-motive-force this action stops the current from the battery 8 from passing from 4 to 5, as it had previously done. Current flows, however, through coil 12 again, causing a second tilting of the container until a bridge of mercury is again formed between the electrodes 4 and 5 whereupon the current which has been passing out of the electrode 5 divides as between the two electrodes 4 and 5, as in any divided metallic circuit. The magnet 12 will, however, again be deënergized as before, the converter will fall back to normal position, and the mercury electrodes will be again separated whereupon the electrode 4 becomes the true negative electrode, starting the operation of the converter through the normal course by way of electrode 4, coils 6 and 7 and battery 8 to the secondary 9 or other source. Now, the cut-out 7 is so proportioned as to operate upon a normal load current. Accordingly, the terminals of the said cut-out are separated when the normal current flows through the path last described, and thus permanently opening the circuit of the magnet 12 which remains out of operation.

Should the alternating current voltage fall for any cause, the apparatus will go out and the switch coil 14 controlling the switch 13 will open, preventing a discharge of the battery through the circuit of the coil 12. The restoration of the alternating current electro-motive-force will cause the apparatus to start up again as already described.

Instead of the storage battery 8 we may have any work circuit containing a counter electro-motive-force; for example, the work circuit supplied from several sources in parallel to the converter when the converter 1 should stop acting for any reason it will start in the manner already described, or a motor may be substituted for the storage battery 8, it being understood that the converter will not start except when the motor is so energized as to have a counter electro-motive-force.

The coil 6 may be placed between the storage battery 8 and the cut-out 7, if so desired. The magnet 14 with its switch 13 may be omitted and a hand switch may be substituted, if so desired.

It is not necessary that the magnet coil 12 be connected as shown between the electrodes 4 and 5, it being merely necessary that it be so excited and controlled that two consecutive connections between 4 and 5 be accomplished during the starting of the device. For example, the coil 12 might be connected with the alternating current source and be connected between the leads of the electrodes 2 and 3 being controlled by a cut-out in the leads of the negative electrode 4 so that on the passage of current through the electrode 4 resulting from the contact of electrodes 4 and 5, the tilting magnet may be deënergized. The cut-out 7 may be placed in the circuit 15 if desired.

I have found the result may be very neatly and satisfactorily accomplished by a careful adjustment of the stops and the tilting magnet and by so controlling the motion of the container that two or more rapidly recurring connections occur between the electrodes 4 and 5, with one motion of the container which result may be obtained by causing the stopping to be abrupt. When the main circuit is closed the storage battery sending current through the magnet 12 causes a tilting of the container 1 sufficient to bring into contact the mercury constituting the electrodes 4 and 5. Thereupon a circuit is formed which includes the said electrodes, the inductance 6 and the magnets 7 and 12. By reason of the action of the magnet 7 the cut-out 11 is operated so as to break this circuit which, however, is momentarily restored by the demagnetization of the magnet 7. During this action the mercury at the electrode 5 has been acting as a negative electrode with relation to the mercury constituting the electrode 4. The rupture of the circuit of the magnet 12 has, however, caused a separation of the electrodes 4 and 5 while the restoration of the circuit again causes contact between the said electrodes followed as before by an immediate separation thereof. Under these circumstances, the rupture between the mercury electrodes 4 and 5 constitutes the electrode 4 a negative electrode and starts the apparatus into operation in the proper way. Consequently, the magnet 7 remains energized and the shunt circuit hereinbefore described is permanently held open during the operation of the apparatus. Meanwhile, the negative electrode resistance having been broken down, current may flow through the converter in the usual way from the positive electrodes 2 and 3 to the negative electrode 4.

The present application is a division of my application Serial Number 259,956, filed May 11th, 1905.

I claim as my invention:

1. The combination with a mercury vapor rectifier, comprising an exhausted container, two main anodes, a vaporizable cathode and a vaporizable supplemental electrode, adapted to contact with the said main cathode on a tilting of the rectifier, an alternating supply circuit, a direct current receiving circuit containing an apparatus having a counter electromotive force and suitable connections therefor, of means for producing tilting of the rectifier whereby contact is produced between the main cathode and the supplemental electrode, connections for permitting the said counter electromotive force to pass current from the main cathode to the supplemental electrode during the connection between these electrodes, means responsive to this current adapted to permit a separation of the electrodes upon this current flow, thus reënergizing the said tilting means, whereby a second contact and separation is produced between the electrodes.

2. The combination with a mercury vapor rectifier, comprising an exhausted container, two main anodes, a vaporizable cathode and a vaporizable supplemental electrode adapted to contact with the said main cathode on a tilting of the rectifier, an alternating supply circuit, a direct current receiving circuit containing an apparatus having a counter electromotive force and suitable connections therefor, of means for producing tilting of the rectifier whereby contact is produced between the main cathode and the supplemental electrode, connections for permitting the said counter electromotive force to pass current from the main cathode to the supplemental electrode during the connection between these electrodes, means adapted to permit a separation of the electrodes upon the passage of this current, thus reënergizing the said tilting means, whereby a second contact and separation is produced between the electrodes, together with means for interrupting the tilting operation responsive to the establishment of normal current flow.

3. The combination with a mercury vapor rectifier, comprising an exhausted container, two main anodes, a vaporizable cathode and a vaporizable supplemental electrode adapted to contact with the said main cathode on a tilting of the rectifier, an alternating supply circuit, a direct current receiving circuit containing an apparatus having a counter electromotive force and suitable connections therefor, of means adapted to tilt the rectifier when the supplemental electrode is not in contact with the main cathode and for releasing the rectifier upon contact between said electrodes, together with means for permitting the counter electromotive force to pass current within the container from the main cathode to the supplemental electrode.

Signed at New York, in the county of New York, and State of New York, this 23rd day of September, A. D. 1909.

PERCY H. THOMAS.

Witnesses:
ALEXANDER BEGG,
THOS H. BROWN.